US012764490B2

(12) United States Patent
Rung et al.

(10) Patent No.: US 12,764,490 B2
(45) Date of Patent: Oct. 13, 2026

(54) AUDIO DEVICE WITH HEAD ORIENTATION-BASED FILTERING AND RELATED METHODS

(71) Applicant: GN Audio A/S, Ballerup (DK)

(72) Inventors: Martin Rung, Brønshøj (DE); Jesper Udesen, Måløv (DK)

( * ) Notice: Subject to any disclaimer, the term of this patent is extended or adjusted under 35 U.S.C. 154(b) by 181 days.

(21) Appl. No.: 18/757,645

(22) Filed: Jun. 28, 2024

(65) Prior Publication Data

US 2025/0016519 A1 Jan. 9, 2025

(30) Foreign Application Priority Data

Jul. 7, 2023 (EP) .................................... 23184263

(51) Int. Cl.
*H04R 5/02* (2006.01)
*H04S 1/00* (2006.01)
*H04S 7/00* (2006.01)

(52) U.S. Cl.
CPC .............. *H04S 7/304* (2013.01); *H04S 1/005* (2013.01); *H04S 7/307* (2013.01)

(58) Field of Classification Search
CPC ........... H04S 7/304; H04S 1/005; H04S 7/307
USPC .................................................. 381/310, 309
See application file for complete search history.

(56) References Cited

U.S. PATENT DOCUMENTS

| | | | | |
|---|---|---|---|---|
| 2012/0077437 A1* | 3/2012 | Agevik ............. | A61M 16/0057 340/539.13 |
| 2019/0200159 A1* | 6/2019 | Park ........................ | G10L 21/02 |
| 2019/0357000 A1* | 11/2019 | Karkkainen ............ | G06F 3/012 |

FOREIGN PATENT DOCUMENTS

| | | | |
|---|---|---|---|
| DE | 2331619 A1 | 1/1975 |
| GB | 2282306 A1 | 3/1995 |
| JP | 408107600 A1 | 4/1996 |
| JP | 408237790 A1 | 9/1996 |

* cited by examiner

*Primary Examiner* — Ammar T Hamid

(57) ABSTRACT

Audio device comprising a first audio wearable adapted to be worn at a first ear of a user and a second audio wearable adapted to be worn at a second ear of the user, the first audio wearable comprising a first output transducer, a first wireless communication interface, one or more first processors, and a first memory, the first audio wearable is configured to obtain a first audio signal via the first wireless communication interface; obtain head orientation data indicative of a head orientation of the user; determine a first filter based on the head orientation data, wherein the first filter is based on a first delay and/or a first level compensation; apply the first filter to the first audio signal to compensate for the head orientation of the user for provision of a first filtered audio signal, and output the first filtered audio signal at the first audio wearable.

15 Claims, 8 Drawing Sheets

AUDIO DEVICE WITH HEAD ORIENTATION-BASED FILTERING AND RELATED METHODS

RELATED APPLICATIONS

This application is a non-provisional application that claims the priority benefit of European Patent Application No. EP 23184263.4 filed on Jul. 7, 2024, the entire contents of which are incorporated herein by reference.

FIELD

The present disclosure pertains to the field of audio devices and methods of operating audio devices, and in particular to audio devices with head orientation-based filtering and related methods.

BACKGROUND

Audio wearables/devices, such as headphones, earphones, and headsets, have gained significant popularity for personal audio listening, communication, and entertainment.

While these devices provide audio playback capabilities, they often struggle to reproduce a sense of spatial perception due to the proximity of the speakers to the user's ears and limitations in conventional audio processing techniques. Traditional audio wearables, such as headphones, earphones, and headsets, focus on stereo or surround sound setups, which rely on multiple speakers positioned around the listener to create a sense of spatiality. However, when applied to audio wearables, these conventional approaches encounter challenges in delivering an immersive sound experience. Some challenges with current audio wearables is that they have no control of sound origin of a sound source and have a lack of spatial cues.

SUMMARY

Advancements in digital signal processing and spatial audio technologies have attempted to address these challenges by introducing techniques such as auralization, 3D rendering, or binaural synthesis. These methods aim to simulate spatial perception by manipulating audio signals to recreate the effect of sounds coming from different directions.

By utilizing binaural playback on headphones, it becomes feasible to generate a spatial perception of sound sources positioned within a "virtual soundscape" surrounding the listener. These soundscapes can be created by embedding spatial information in the signals, either through recordings made using a dummy head or through synthesizing the spatial effects during the processing stage.

However, limitations arises when the listener turns their head. In such cases, the perceived virtual soundscape moves along with the head, which is in contrast to the natural behavior of a real soundscape that remains anchored in the physical space and doesn't shift with head movements. This discrepancy in perception may introduce an unnatural element and compromise the illusion of the virtual soundscape, potentially leading to its breakdown.

When a sensor measures the head turn, it becomes possible to incorporate the head rotation angle into the synthesis of spatial information. This inclusion results in a perceived stationary virtual soundscape. However, achieving this in various setups can be technically complex. Real-time synthesis is required, and the head rotation angle must be integrated into the synthesis process. If the synthesis occurs outside the headphones or earlier in the transmission chain, challenges with data exchange arise.

Therefore, there is still a need for improved methods and audio devices that optimize spatial perception, e.g., for audio devices and audio wearables.

Accordingly, there is a need for audio devices with head-orientation-based filtering and methods of operating an audio device, which may mitigate, alleviate, or address the shortcomings existing and may provide audio wearables/devices with improved spatial cues allowing for head-orientation-based filtering and in turn improved spatial perception for users.

An audio device is disclosed. The audio device comprises a first audio wearable adapted to be worn at a first ear of a user and a second audio wearable adapted to be worn at a second ear of the user. The first audio wearable, such as the audio device, comprises a first output transducer, a first wireless communication interface, one or more first processors, and a first memory. The first audio wearable is configured to obtain a first audio signal, such as via the first wireless communication interface. The first audio wearable is configured to obtain head orientation data indicative of a head orientation of the user, such as via the first wireless communication interface and/or via a head orientation sensor. The first audio wearable is configured to determine, such as using the one or more first processors, a first filter based on the head orientation data, wherein the first filter is based on a first delay and/or a first level compensation. The first audio wearable is configured to apply, such as using the one or more first processors, the first filter to the first audio signal to compensate for the head orientation of the user for provision of a first filtered audio signal. The first audio wearable is configured to output, such as using the one or more first processors and via the first output transducer, the first filtered audio signal, e.g., at the first audio wearable.

A method of operating an audio device is disclosed. The method comprises obtaining a first audio signal. The method comprises obtaining head orientation data indicative of a head orientation of a user. The method comprises determining a first filter based on the head orientation data, wherein the first filter is based on a first delay and/or a first level compensation. The method comprises applying the first filter to the first audio signal to compensate for the head orientation of the user for provision of a first filtered audio signal. The method comprises outputting the first filtered audio signal.

The present disclosure provides improved head-orientation-based filtering of audio signals and in turn improved spatial perception while reducing the technical complexity of the filtering and audio processing. The present disclosure provides a natural perception of spatial soundscape while reducing the technical complexity of the filtering and audio processing. For example, in case of simultaneous visual stimuli the perception of the sound fusing with the visual image is enhanced. For example, a user participating in an online meeting with video of participants on the screen of an electronic device, will have a perception of a natural behavior of a real soundscape that remains anchored in the physical space and doesn't shift with head movements. It may be appreciated that the screen may be anchored in the physical space and doesn't shift with head movements.

It may be appreciated that the present disclosure provides a simple head-orientation-based filtering of audio signals while reducing the computational resources needed to process the audio signals. This may be achieved by processing the audio signal at the audio device and by processing the audio signals of the audio wearables separately, e.g., by processing the first audio signal of the first audio wearable separately from the second audio signal of the second audio wearable or by processing only the first audio signal by the first audio wearable. The present disclosure allows to have real-time synthesis of filtered audio signals. The Applicant has realized that it is the difference between the first audio signal and the second audio signal that is important, such as the different in perception between the ears of a user of the audio device/wearable. The present disclosure has therefore the advantage that it may be sufficient to apply a filter on one audio wearable, such as on one ear of the user. This may simplify further the head-orientation based filtering and allow to have head-orientation based filtering in capacity-limited audio wearables/devices. However, the present disclosure also describes application of filters on both audio wearables and the advantages thereof.

On a daily basis, humans use small head orientation changes, such as small head rotations, in order to localize an audio source in space. The present disclosure allows to imitate these small head orientations changes for localization of an audio source and to imitate natural perception of where spatial soundscape. The present disclosure therefore provides improved spatial cues for improving spatial perception of audio for users.

An advantage of the present disclosure is also that there is a reduces data flow between the audio device and an electronic device that the audio device is connected to, and also reduced data flow between audio wearables of the audio device. This may allow for faster processing and power saving at each audio wearable.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
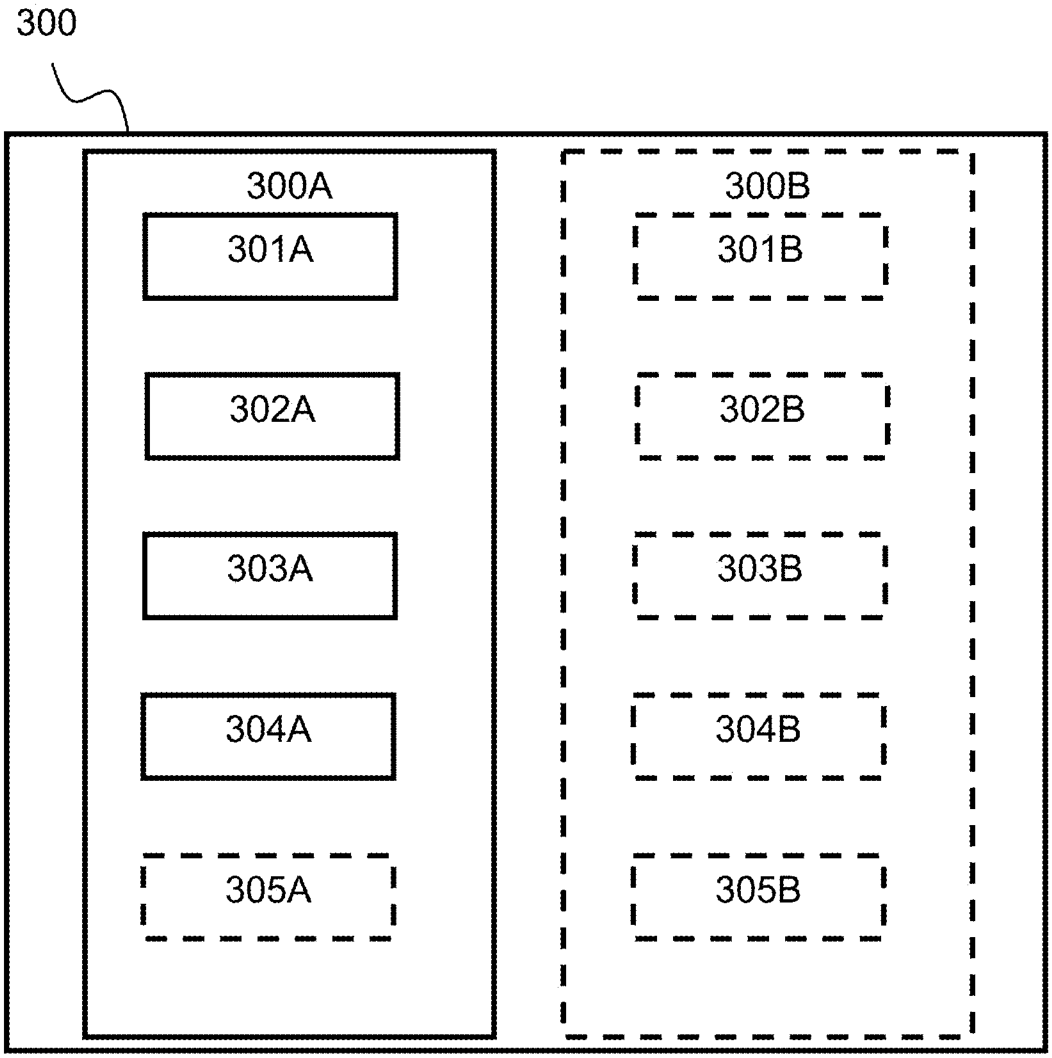
FIG. 1 schematically illustrates an example audio device according to the present disclosure, FIGS. 2A-2B schematically illustrate an example conventional audio device, FIGS. 3A-3C schematically illustrate an example audio device according to the present disclosure where the technique disclosed herein is applied.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

An audio device is disclosed. The audio device comprises a first audio wearable adapted to be worn at a first ear of a user and a second audio wearable adapted to be worn at a second ear of the user.

An audio device is disclosed. The audio device may be configured to act as receiver device and/or a transmitter device. In other words, the audio device is configured to receive input signals, such as audio data, from an audio device configured to act as a transmitter device or vice versa. The audio device as disclosed herein may comprise one or more interfaces, one or more audio speakers, one or more microphones, e.g., including a first microphone, one or more processors, and one or more memories. The one or more interfaces may comprise one or more of: a wireless interface, a wireless transceiver, an antenna, an antenna interface, a microphone interface, and a speaker interface.

An audio device may comprise one or more of: a headset, headphones, earbuds, a neckband, and a hearing device.

An audio wearable may be seen as a part of the audio device adapted to be worn at an ear of a user of the audio device. For example, when the audio device is a headset or headphones, the audio wearable may be a part of the headset, such as an earcup or an earpiece/earbud of a headset or a headphone. The audio device may comprise a headset comprising a headband and/or a connecting band, a wire, or cable between the earcups, or earpiece/earbuds. The first audio wearable and the second audio wearable may be configured to communicate with each other via the wire or cable. The first audio wearable may for example be a first earcup and the second audio wearable may be a second earcup of the audio device. The first audio wearable may be a left earcup and the second audio wearable may be a right earcup of the audio device or vice-versa.

For example, when the audio device comprises earpieces or earbuds, the audio wearable may be a single earpiece or earbud of the audio device. The first audio wearable may for example be a first earpiece/earbud and the second audio wearable a second earpiece/earbud of the audio device. The first audio wearable may be a left earpiece/earbud and the second audio wearable may be a right earpiece/earbud of the audio device or vice-versa. The first audio wearable and the second audio wearable may be separate from each other, such as not connected to each other with a band or cable. The first audio wearable and the second audio wearable may communicate to each other via wireless communication. In other words, the first earpiece/earbud and the second earpiece/earbud may be separate from each other. Alternatively or additionally, the first audio wearable and the second audio wearable may not communicate with each other.

In one or more example audio devices, the first audio wearable is a first earpiece, and the second audio wearable is a second earpiece.

In one or more example audio devices, the audio device is a headset and wherein the first audio wearable is a first earcup and the second audio wearable is a second earcup.

The first audio wearable comprises a first output transducer, such as the audio device comprises a first output transducer. An output transducer may be seen as an audio output transducer. An output transducer may be seen as an output transducer that converts electrical audio signals into sound waves. An audio output transducer is configured to produce audible output, allowing users to listen to audio from various electronic devices or systems, such as the audio device as disclosed herein. A output transducer may comprise one or more speakers and/or receivers configured to convert electrical audio signals into sound waves.

The first audio wearable comprises a first wireless communication interface.

In one or more example audio devices, a wireless interface, such as the first wireless communication interface, comprises a wireless transceiver, also denoted as a radio transceiver, and an antenna for wireless transmission and reception of an input signal, such as an audio signal and/or a data signal, such as for wireless transmission of an output signal and/or wireless reception of a wireless input signal. The audio device, such as the first audio wearable and/or the first wireless communication interface, may be configured for wireless communication with one or more electronic devices, such as another audio device, another audio wearable, a smartphone, a tablet, a computer and/or a smart watch. The audio device, such as the first audio wearable and/or the first wireless communication interface, optionally comprises an antenna for converting one or more wireless input audio signals to antenna output signal(s). The audio device, such as the first audio wearable and/or the first wireless communication interface, may be configured for wireless communications via a wireless communication system, such as short-range wireless communications systems, such as Wi-Fi, Bluetooth, Zigbee, IEEE 802.11, IEEE 802.15, infrared and/or the like.

The audio device, such as the first audio wearable and/or the first wireless communication interface, may be configured for wireless communications via a wireless communication system, such as a 3GPP system, such as a 3GPP system supporting one or more of: New Radio, NR, Narrow-band IoT, NB-IoT, and Long Term Evolution—enhanced Machine Type Communication, LTE-M, millimeter-wave communications, such as millimeter-wave communications in licensed bands, such as device-to-device millimeter-wave communications in licensed bands.

In one or more example audio devices, the interface of the audio device, such as the first audio wearable and/or the first wireless communication interface, comprises one or more of: a Bluetooth interface, Bluetooth low energy interface, and a magnetic induction interface. For example, the interface of the audio device may comprise a Bluetooth antenna and/or a magnetic interference antenna.

In one or more example audio devices, the interface, such as the first audio wearable, may comprise a connector for wired communication, via a connector, such as by using an electrical cable. The connector may connect one or more microphones to the audio device. The connector may connect the audio device to an electronic device, e.g., for wired connection. The connector may be seen as an electrical connector, such as a physical connector for connecting the audio device via an electrical wire to another device. The connector may connect the first audio wearable to the second audio wearable.

The one or more interfaces can be or comprise wireless interfaces, such as transmitters and/or receivers, and/or wired interfaces, such as connectors for physical coupling. For example, the audio device, such as the first audio wearable, may have an input interface configured to receive data, such as a microphone input signal.

Further, the audio device, such as the first audio wearable, may comprise one or more microphones, such as a first primary microphone, optionally a first secondary microphone, optionally a first tertiary microphone and optionally a first quaternary microphone.

The first audio wearable comprises one or more first processors. The one or more first processors may be configured to process audio at the first audio wearable.

The audio device, such as the first audio wearable, is configured to obtain, such as using the one or more first processors, a first audio signal, e.g., via the first wireless communication interface. The first audio signal may be seen as a first audio input signal. The first audio signal may be seen as an audio signal specifically for the first audio wearable, e.g., different from the second audio signal. In other words, the first audio signal and the second audio signal as disclosed herein may be different separate signals, e.g., each being configured for its audio wearable respectively. For example, the first audio signal may be a first pre-processed binaural signal being different for each audio wearable. The first audio signal may be an audio signal received from a far-end device, e.g., associated with one or more users that the user of the audio device is communicating with. The first audio signal may be an audio signal received from an electronic device, such as a computer, mobile phone, tablet, and/or television etc. The first audio signal may be indicative of or representative of audio from a video content and/or audio content, such as a voice from a far-end user, a movie, a song, etc.

The audio device may for example be seen as a conference audio device, e.g., configured to be used by a party (such as one or more users at a near-end) to communicate with one or more other parties (such as one or more users at a far-end). The audio device configured to act as a receiver device may also be configured to act as a transmitter device when transmitting back an output signal to the far-end. The receiver audio device and the transmitter audio device may therefore switch between being receiver audio device and transmitter audio device. The audio device may be seen as a smart audio device. The audio device may be used for a conference and/or a meeting between two or more parties being remote from each other. The audio device may be used by one or more users in a vicinity of where the audio device is located, also referred to as a near-end. The audio device may be configured to output, such as using an output transducer, such as the first output transducer and based on the first audio signal, an audio device output at the receiver end, such as a filtered audio signal, e.g., a first filtered audio signal. The first filtered audio signal may be seen as an audio output signal that is an output of the first output transducer at a near-end where the audio device and the user(s) of the audio device are located.

The audio device, such as the first audio wearable, is configured to obtain, such as using the one or more first processors, head orientation data indicative of a head orientation of the user of the audio device, e.g., via the first wireless communication interface. Head orientation data may be seen as data, e.g., indicative of information or measurements, that describe the position and/or orientation of a person's head, such as the user of the audio device. Head orientation data may be data indicative of a head orientation of the user in three-dimensional space. Head orientation data may comprise one or more angles or coordinates that represent the rotation or tilt of the head of the user along the X, Y, and/or Z axes.

Head orientation data may be obtained using various technologies, such as motion capture systems, inertial measurement units (IMUs), and/or computer vision algorithms. Head orientation data may be obtained using one or more sensors, cameras, and/or a combination of both to track the movement and orientation of the head. Head orientation data may be indicative of a head rotation of the user of the audio device.

A head orientation of the user may be seen as an orientation of the head of the user with respect to a start, reference, or initial position of the head of the user.

In one or more example audio devices, the head orientation data comprises a head rotation angle. The head rotation angle may be measured with respect to a line of sight of the user at a reference position of the user's head. The head rotation angle may be seen as an angle measured with respect to a line of sight of the user at a reference position of the user's head. For example, a reference position of the user's head may be a starting position of the user's head when starting to obtain audio signals at the audio device, such as the first audio signal, and/or when the user starts to wear the audio device. The head rotation angle may be seen as an angle measured along a generally horizontal plane in front of the user, such as an azimuth plane. Alternatively or additionally, a reference position of the user's head may be a starting position of the user's head when starting to output audio signals at the audio device, such as the first filtered audio signal. The head rotation angle may be seen as an azimuth angle with respect to the user.

In other words, a reference position of the user's head may be a starting position of the user's head at a reference time T_0 when starting to obtain audio signals at the audio device, such as the first audio signal, and/or when the user starts to wear the audio device.

A line of sight of the user may be seen as a general direction towards which the user is looking at a reference position of the user's head and/or at a reference time T_0. It may be appreciated that an audio signal may have an incidence direction with respect to a general direction towards which the user is looking at a reference position of the user's head.

In one or more example audio devices, the audio device comprises a head orientation sensor configured to provide the head orientation data, such as first head orientation data. The first audio wearable comprises the head orientation sensor. In one or more example audio devices, the second audio wearable comprises a head orientation sensor, such as a second orientation sensor configured to provide second head orientation data. The head orientation sensor may be seen as a sensor configured to measure and/or determine a head orientation of a user of the audio device. For example, the head orientation sensor may be seen as a movement sensor, such as an inertial measurement unit, IMU, an accelerometer, a gyroscope, and/or a magnetometer. The head orientation sensor may be configured to generate or provide the head orientation data or at least part of the head orientation data. The head orientation sensor may be configured to a combination of both tracking the movement and orientation of the head. The head orientation sensor may be configured to generate head orientation data indicative of a head rotation of the user of the audio device.

In one or more example audio devices, the audio device is configured to send the head orientation data from the first audio wearable to the second audio wearable. For example, when it is only the first audio wearable that comprises a head orientation sensor or that it is the first audio wearable receiving the head orientation data, the audio device may be configured to send the head orientation data from the first audio wearable to the second audio wearable. The audio device may be configured to send the head orientation data from the first audio wearable to the second audio wearable via the first wireless communication interface and/or using the one or more first processors. In other words, the head orientation data may be generated at the first audio wearable and forwarded to the second audio wearable. This allows to have separate processing of audio signals at the first audio wearable and at the second audio wearable while having a more simple audio device with only one head orientation sensor.

In one or more example audio devices, the audio device is configured to obtain the head orientation data from an external head orientation sensor via the first wireless communication interface. In other words, the audio device may be configured to obtain head orientation data from a head orientation sensor being external from the audio device. For example, an external head orientation sensor may be located in an electronic device as disclosed herein that the audio device is connected to and/or communicates with. The electronic device may for example comprise a computer vision system acting as head orientation sensor configured to determine and/or generate head orientation data.

The audio device, such as the first audio wearable, is configured to determine, e.g., using the one or more first processors, a first filter based on the head orientation data, wherein the first filter is based on a first delay and/or a first level compensation. To determine a first filter based on the head orientation data may comprise to determine the first filter as a function of the head orientation data, such as using the head orientation data as an input in the determination of the first filter. For example, the first filter may be determined based on the head rotation angle as disclosed herein. To determine the first filter may comprise to retrieve a filter from a lookup table based on the head orientation data.

The first filter may be seen as a filter to be applied to the first audio signal. The first filter may be determined at the first audio wearable, e.g., at the one or more first processors. The first filter may be seen as a filter for compensating for a head orientation of the user of the audio device at the first audio wearable. The first filter may comprise a first delay and/or a first level compensation, e.g., to be applied to the first audio signal. In other words, the audio device, such as the first audio wearable, is configured to determine the first delay and/or the first level compensation and to determine the first filter as a function of the first delay and/or the first level compensation and/or as an input in the determination of the first filter.

The first filter may be configured to modify an interaural time difference, ITD, e.g., by using the first delay and/or to modify an interaural level difference, ILD, e.g., by using the first level compensation. The first delay may be configured to modify an ITD of the first audio signal, e.g., compared with a second audio signal, by being applied to the first audio signal. The first delay may be seen as a delay in the time domain.

In one or more example audio devices, the first filter is a time domain filter and/or the second filter is a time domain filter.

The first level compensation may be configured to modify an ILD of the first audio signal, e.g., compared with a second audio signal, by being applied to the first audio signal. The first level compensation may be seen as a compensation in the amplitude domain. In other words, the first filter may be an amplitude domain filter, such as a gain filter. In other words, to apply the first filter may comprise to apply a first gain to the first audio signal. The first level compensation may be seen as a sound level compensation between the first audio wearable and the second audio wearable, such as between the first audio signal and the second audio signal. It may be appreciated that level compensation may only be applied on one audio wearable, such as only on the first audio wearable. Level compensation may also be applied on both the first audio wearable and the second audio wearable.

The audio device, such as the first audio wearable, is configured to apply, e.g., using the one or more first processors, the first filter to the first audio signal to compensate for the head orientation of the user for provision of a first filtered audio signal. In other words, the audio device, such as the first audio wearable, is configured to apply, e.g., using the one or more first processors, the first delay and/or the first level compensation to the first audio signal to compensate for the head orientation of the user for provision of a first filtered audio signal. The first filtered audio signal may also be denoted a first filtered audio output signal. By applying the first filter to the first audio signal, the audio device, such as the first audio wearable, may compensate for perception of the sound or virtual soundscape, such as the first audio signal and/or the second audio signal, moving along the head when the user is moving/turning his head. The first filtered audio signal may be seen as a processed first audio signal configured to be output at the first audio wearable. The first filtered audio signal may be seen as a first audio signal where the first delay and/or the first level compensation has been applied. The first filtered audio signal may be seen as a first audio signal where the head orientation has been compensated for.

The audio device, such as the first audio wearable, is configured to output the first filtered audio signal at the first audio wearable. To output the first filtered audio signal may comprise to output the first filtered audio signal at a receiver or speaker of the first audio wearable for the user of the audio device to hear or listen to.

In one or more example audio devices, the first delay is based on a base delay and/or a first compensation delay. In one or more example audio devices, to apply the first filter comprises to apply the first delay, such as the base delay and the first compensation delay, to the first audio signal. The base delay may be seen as a constant delay, such as a constant time delay to be applied to first audio signal. The base delay may be in the range of 0 ms to 5 ms, preferably in the range of 0.5 ms to 3 ms, more preferably in the range of 0.5 ms to 1 ms, and for example a base delay of 0.7 ms. The base delay may be applied in order to delay the first audio signal and/or the second audio signal by a constant delay. The base delay may be configured to apply the same constant delay both to the first audio signal and the second audio signal, e.g., in order to delay the first audio signal and the second audio signal in the same way. It may be appreciated that the base delay and/or the first compensation delay are used to modify the ITD between the first audio signal and the second audio signal. To apply the first filter, such as the first delay, may comprise to multiply the first delay to a filter function, e.g., to apply the first delay to the first audio signal such that a phase shift occurs, and thereby a delay. In one or more example audio devices, to apply the first filter may comprise to add a constant time delay, such as the first delay, to the first audio signal.

It may be appreciated that to apply the first filter, such as to apply the base delay and the first compensation delay, may comprise to apply a total delay e.g., being the first delay. In other words, the first delay may be determined based on the base delay and/or the first compensation delay, e.g., by add up or subtracting the base delay and the first compensation delay.

In one or more example audio devices, the first compensation delay is configured to modify an Interaural Time Difference between the first audio signal and the second audio signal, and the second compensation delay is configured to modify an Interaural Time Difference between the first audio signal and the second audio signal.

In one or more example audio devices, the first level compensation is configured to modify an Interaural Level Difference between the first audio signal and the second audio signal, and the second level compensation is configured to modify the Interaural Level Difference between the first audio signal and the second audio signal.

In one or more example audio devices, the base delay is a constant delay configured to be applied to the first audio signal and the second audio signal.

In reality, when a person moves and rotates his head the first audio signals arriving at the first ear and the second audio signals arriving at the second ear would theoretically not arrive at the same time and/or not with the same energy (e.g., sound level/volume), since the respective ears would not have the same distance to an emitting audio source. There will be a delay between the reception of the first audio signals arriving at the first ear and the second audio signals arriving at the second ear and/or a sound level/volume difference. This delay and/or sound level is what allows a person to perceive where sound comes from in relation to the person and to perceive where the sound source emitting the sound is located in space. The first filter, such as first delay and/or first level compensation, may be configured to replicate this mechanism for audio signals at the audio device. As explained earlier, when having a "virtual" sound source, the user of an audio device would perceive the sound and location audio source emitting the sound as following the movements of his head. This gives a very unnatural and confusing perception of sound and location of audio source emitting the sound. Since an audio signal cannot be brought forward in time, the base delay allows to delay evenly the first audio signal and the second audio signal in order to be able to apply a further delay, e.g., to apply a first compensation delay that can be negative. In other words, the base delay allows to apply a negative first compensation delay and/or second compensation delay.

The first compensation delay may be seen as a variable delay depending on the head orientation data, such as a variable time delay to be applied to the first audio signal. For example, the first compensation delay may be based on the head rotation angle. The audio device, such as the first audio wearable, may be configured to determine the first compensation delay by determining which time delay to apply to the first audio signal and/or the second audio signal depending on the head rotation angle measured with respect to a line of sight of the user at a reference position of the user's head. In one or more example audio devices, it may be assumed that the virtual audio source emitting the audio signals is located in front of the user, such as in the range of −90° to +90°, −75° to +75°, −60° to +60°, −50° to +50°, −30° to +30°, or −20° to +20° with respect to a line of sight of the user at a reference position of the user's head. In other words, it may be assumed that the virtual soundscape is mainly located in a frontal hemisphere with respect to the user. Applying the first filter, such as the base delay and/or the first compensation delay may emphasize the perceived sound as being fixed at a certain position or position range in front of the user.

In one or more example audio devices, the second audio wearable comprises a second output transducer, such as the audio device comprises a second output transducer.

In one or more example audio devices, the second audio wearable comprises a second wireless communication interface. The second audio wearable comprises one or more second processors. The one or more second processors may be configured to process audio at the second audio wearable. In one or more example audio devices, the second audio wearable is configured to obtain, such as using the one or more second processors, a second audio signal, e.g., via the second wireless communication interface.

In one or more example audio devices, the second audio wearable is configured to obtain, such as using the one or more second processors, head orientation data indicative of a head orientation of the user of the audio device, e.g., via the second wireless communication interface. In one or more example audio devices, the audio device, such as the second audio wearable, is configured to determine, e.g., using the one or more second processors, a second filter based on the head orientation data, wherein the second filter is based on a second delay and/or a second level compensation. In one or more example audio devices, the audio device, such as the second audio wearable, is configured to apply, e.g., using the one or more second processors, the second filter to the second audio signal to compensate for the head orientation of the user for provision of a second filtered audio signal. The audio device, such as the second audio wearable, is configured to output the second filtered audio signal at the second audio wearable.

It may be appreciated that the description relating to the first audio wearable may apply equivalently to the description of the second audio wearable. For example, the description of first output transducer may also apply to the second output transducer, the description of first wireless communication interface may also apply to the second wireless communication interface, etc. The second audio wearable may comprise a second memory.

In one or more example audio devices, the second delay is based on the base delay and a second compensation delay. In one or more example audio devices, to apply the second filter comprises to apply the second delay, such as the base delay and the second compensation delay, to the second audio signal.

In one or more example audio devices, to apply the second filter comprises to apply the second delay, such as the base delay and the second compensation delay, to the second audio signal. The base delay may be seen as a constant delay, such as a constant time delay to be applied to second audio signal. The base delay may be in the range of 0 ms to 5 ms, preferably in the range of 0.5 ms to 3 ms, more preferably in the range of 0.5 ms to 1 ms, and for example a base delay of 0.7 ms. The base delay may be applied in order to delay the first audio signal and/or the second audio signal by a constant delay. The base delay may be configured to apply the same constant delay both to the first audio signal and the second audio signal, e.g., in order to delay the first audio signal and the second audio signal in the same way. It may be appreciated that the base delay, the first compensation delay, and/or the second compensation delay are used to modify the ITD between the first audio signal and the second audio signal. To apply the second filter, such as the second delay, may comprise to multiply the second delay to a filter function, e.g., to apply the second delay to the second audio signal such that a phase shift occurs, and thereby a delay. In one or more example audio devices, to apply the second filter may comprise to add a constant time delay, such as the second delay, to the second audio signal.

The second compensation delay may be seen as a variable delay depending on the head orientation data, such as a variable time delay to be applied to the second audio signal. For example, the second compensation delay may be based on the head rotation angle. The audio device, such as the second audio wearable, may be configured to determine the second compensation delay by determining which time delay to apply to the first audio signal and/or the second audio signal depending on the head rotation angle measured with respect to a line of sight of the user at a reference position of the user's head. In one or more example audio devices, it may be assumed that the virtual audio source emitting the audio signals is located in front of the user, such as in the range of −90° to +90°, −75° to +75°, −60° to +60°, −50° to +50°, −30° to +30°, or −20° to +20° with respect to a line of sight of the user at a reference position of the user's head. In other words, it may be assumed that the virtual soundscape is mainly located in a frontal hemisphere with respect to the user. Applying the second filter, such as the base delay and/or the second compensation delay may emphasize the perceived sound as being fixed at a certain position or position range in front of the user. It may be appreciated that when processing only takes place on the first audio wearable, the second compensation delay may be equal to 0 and/or may not be needed.

In one or more example audio devices, the first audio signal and/or the second audio signal are binaural audio signals. The first audio signal and/or the second audio signal may be seen as audio signals that have been generated to create a spatial perception of sound sources localized in the space around the user of the audio device. For example, the first audio signal and/or the second audio signal may be seen as audio signals that have been generated by embedding spatial information when recording the audio signals, e.g., by recording the audio signals with a dummy head and/or synthesized by applying spatial effects with signal processing.

In one or more example audio devices, the first audio signal and/or the second audio signal are stereophonic audio signals, monaural audio signals, surround sound audio signals, and/or multichannel audio signals.

In one or more example audio devices, the first filter and/or the second filter are frequency dependent.

In one or more example audio devices, the first compensation delay is frequency-based and/or the second compensation delay is frequency-based. In other words, the first compensation delay and/or the second compensation delay may be frequency dependent.

In one or more example audio devices, the first filter and/or the second filter may be or comprise a head related transfer function, HRTF, filter. A HRTF filter may be seen as a digital signal processing filter designed to mimic the acoustic filtering properties of an individual's head, ears, and/or torso. A HRTF filter may be used to simulate the perception of three-dimensional sound localization and spatial cues experienced by a user. A HRTF filter takes an audio signal as input and applies frequency-dependent modifications to replicate the way sound waves interact with the listener's unique anatomy. A HRTF filter may be dependent on the frequency and/or the position of an audio source. A HRTF filter may consist of a set of frequency response measurements or mathematical models that represent the characteristics of how sound is modified as it reaches each ear. These measurements or models may be derived empirically, e.g., from research and experimentation conducted on human subjects or dummies. When applied to an audio signal, a HRTF filter alters the signal's spectral content and timing properties to replicate the cues that the user would typically perceive in a real-world listening environment. This may include differences in arrival time, intensity, and/or spectral shaping that occur as sound waves reach each ear from different directions. By convolving an audio signal with a HRTF filter, it may be possible to provide an output simulating the auditory experience of sound sources originating from different spatial locations. This may enable the creation of immersive audio environments, such as virtual reality or binaural audio systems, where sounds appear to come from specific directions and distances, enhancing the perception of realism and spatial accuracy for the listener. It may be appreciated that the audio device is configured to apply a first HRTF filter on the first audio signal by using the first audio wearable and to apply a second HRTF filter on the second audio signal by using the second audio wearable. Therefore, the application of the first filter and the second filter is done separately on different entities, namely the first audio wearable and the second audio wearable. A HRTF filter may comprise a first part being based on, such as dependent on, the head orientation data and a second part being based on, such as dependent on, the frequency of the audio signal. The first HRTF filter may be seen as a right HRTF filter and the second HRTF filter may be seen as a left HRTF filter. The first HRTF filter may for example be:

$$H_1(\alpha) = \frac{HRTF_1(-\alpha)}{HRTF_1(0)}$$

Where HRTF_1(α) is the first part being dependent on a head rotation angle α and dependent on the frequency of the first audio signal, and where HRTF_1(0) is the second part being dependent on the frequency of the first audio signal and not the head rotation angle α.

The second HRTF filter may for example be:

$$H_2(\alpha) = \frac{HRTF_2(-\alpha)}{HRTF_2(0)}$$

Where HRTF_2(α) is the first part being dependent on a head rotation angle α and dependent on the frequency of the second audio signal, and where HRTF_2(0) is the second part being dependent on the frequency of the second audio signal and not the head rotation angle α.

In one or more example audio devices, the first filter and/or the second filter may be or comprise a head related impulse response, HRIR, filter. A HRIR filter may be seen as a digital signal processing filter that represents the acoustic characteristics of a user's head, ears, and torso as impulse responses. Unlike an HRTF filter, which works in the frequency domain, a HRIR filter operates in the time domain. A HRIR filter may be determined by capturing the response of a user's ears to an impulse or short-duration sound stimulus. This involves measuring the sound signals that reach each ear as the impulse travels through the user's unique anatomy. A HRIR filter may for example be determined by performing binaural recordings, where microphones are placed at the entrance of each ear canal to capture the acoustic responses. The obtained impulse responses, one for each ear, may represent the complete acoustic characteristics of the user's HRTF at various angles and frequencies. Each impulse response is a time-domain representation of the way sound is filtered, delayed, and shaped as it reaches each ear. To apply a HRIR filter to an audio signal may comprise to convolve the audio signal with the respective impulse response of the desired spatial location and frequency. When applying a HRIR filter the audio signal is modified by incorporating the time-domain characteristics of the user's individualized HRIR. This may for example result in a binaural audio output that accurately simulates the perception of sound sources coming from specific directions and distances. A HRIR filter may enhance the immersive experience by providing accurate sound localization and spatial cues that closely resemble real-world listening scenarios.

A method of operating an audio device is disclosed. The method may be seen as a method of head orientation based processing. The method comprises obtaining a first audio signal. The method comprises obtaining head orientation data indicative of a head orientation of a user. The method comprises determining a first filter based on the head orientation data, wherein the first filter is based on a first delay and/or a first level compensation. The method comprises applying the first filter to the first audio signal to compensate for the head orientation of the user for provision of a first filtered audio signal. The method comprises outputting the first filtered audio signal.

It is to be understood that a description of a feature in relation to the audio device is also applicable to the corresponding feature in the method(s) of operating an audio device as disclosed herein and vice versa.

FIG. 1 schematically illustrates an example audio device, such as an audio device 300 according to the present disclosure. The audio device 300 may be seen as an audio communication device. The audio device 300 comprises a first audio wearable 300A adapted to be worn at a first ear of a user and a second audio wearable 300B adapted to be worn at a second ear of the user. The first audio wearable 300A comprises a first output transducer 304A, a first wireless communication interface 303A, one or more first processors 302A, and a first memory 301A. The audio device 300, such as the first audio wearable 300A, is configured to obtain, such as using the one or more first processors 302C, a first audio signal, e.g., via the first wireless communication interface 303A. The audio device 300, such as the first audio wearable 300A, is configured to obtain, such as using the one or more first processors 302A, head orientation data indicative of a head orientation of the user of the audio device 300, e.g., via the first wireless communication interface 303A.

The audio device 300, such as the first audio wearable 300A, is configured to determine, e.g., using the one or more first processors 302A, a first filter based on the head orientation data, wherein the first filter is based on a first delay and/or a first level compensation. The audio device 300, such as the first audio wearable 300A, is configured to apply, e.g., using the one or more first processors 302A, the first filter to the first audio signal to compensate for the head orientation of the user for provision of a first filtered audio signal. The audio device 300, such as the first audio wearable 300A, is configured to output the first filtered audio signal at the first audio wearable 300A.

In one or more example audio devices, the second audio wearable 300B comprises a second output transducer 304B, such as the audio device 300 comprises a second output transducer 304B.

In one or more example audio devices, the second audio wearable 300B comprises a second wireless communication interface 303B. In one or more example audio devices, the second audio wearable 300B comprises one or more second processors 302B. The one or more second processors 302B may be configured to process audio at the second audio wearable 300B. In one or more example audio devices, the second audio wearable 300B is configured to obtain, such as using the one or more second processors 302B, a second audio signal, e.g., via the second wireless communication interface 303B.

In one or more example audio devices, the second audio wearable 300B is configured to obtain, such as using the one or more second processors 302B, head orientation data indicative of a head orientation of the user of the audio device 300, e.g., via the second wireless communication interface 303B. In one or more example audio devices, the audio device 300, such as the second audio wearable 300B, is configured to determine, e.g., using the one or more second processors 302B, a second filter based on the head orientation data, wherein the second filter is based on a second delay and/or a second level compensation. In one or more example audio devices, the audio device 300, such as the second audio wearable 300B, is configured to apply, e.g., using the one or more second processors 302B, the second filter to the second audio signal to compensate for the head orientation of the user for provision of a second filtered audio signal. In one or more example audio devices, the audio device 300, such as the second audio wearable 300B, is configured to output the second filtered audio signal at the second audio wearable 300B, e.g., using the one or more second processors 302B and via the second output transducer 304B.

In one or more example audio devices, the audio device 300 comprises a head orientation sensor configured to provide the head orientation data, wherein the first audio wearable 300A comprises the head orientation sensor, such as a first head orientation sensor 305A.

In one or more example audio devices, the second audio wearable 300B comprises a head orientation sensor, such as a second head orientation sensor 305B.

In one or more example audio devices, the audio device 300 is configured to send the head orientation data from the first audio wearable 300A, such as via the first wireless communication interface 303A and/or the second wireless communication interface 303B, to the second audio wearable 300B.

Figure 2A:
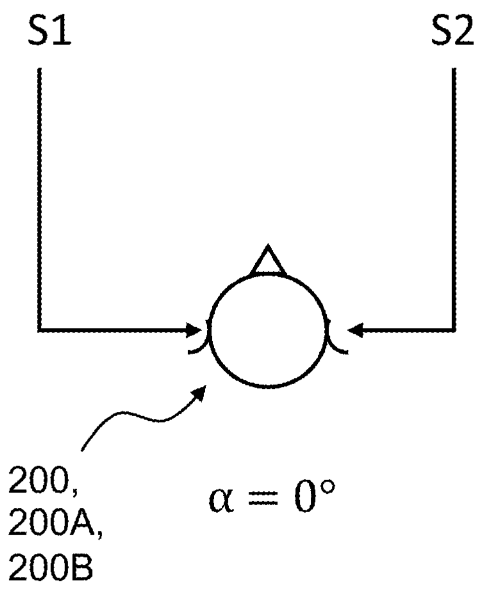
Figure 2B:
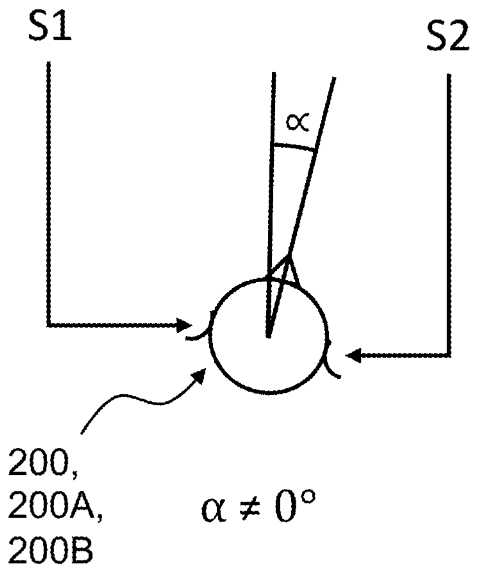

FIGS. 2A-2B schematically illustrate an example conventional audio device, such as an audio device 200. In FIG. 2A, a first audio signal S1 is received at the audio device 200, such as received at a first audio wearable 200A, and a second audio signal S2 is received at the audio device 200, such as received at a second audio wearable 200B. The head of the user is at a reference position of the user's head where an angle $\alpha$ is equal to 0.

In FIG. 2B, the user has moved his head with respect to the reference position of the user's head with an angle $\alpha$ different from 0. The first audio signal S1 and the second audio signal S2 are not processed and just outputted by the audio device 200. In this situation, the user of the audio device 200 perceives the sound and location audio source emitting the sound as following the movements of his head. This gives a very unnatural and confusing perception of sound and location of audio source emitting the sound for the user.

Figure 3A:
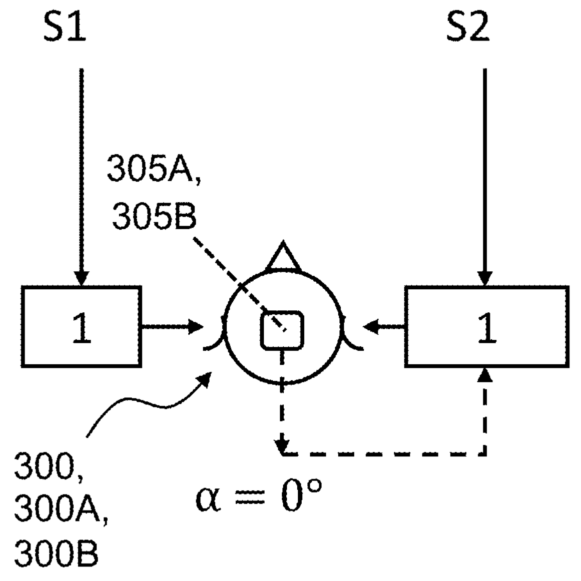
Figure 3B:
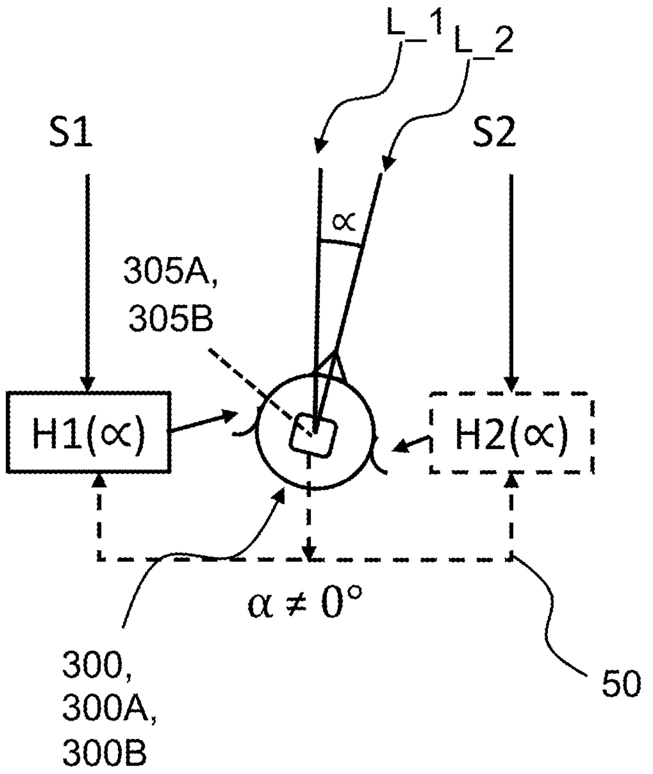
Figure 3C:
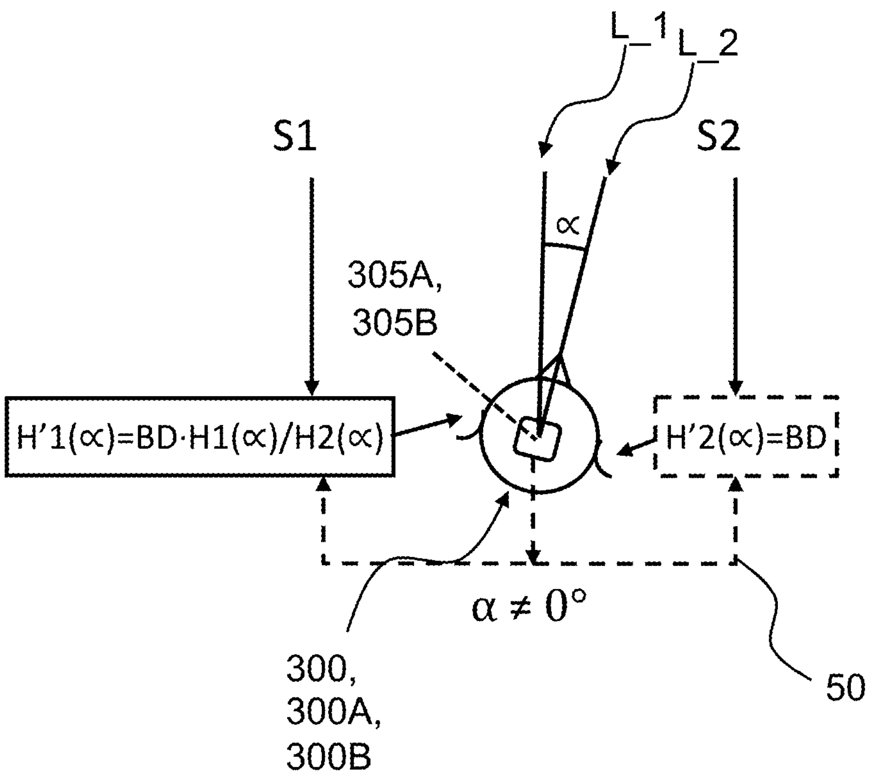

FIGS. 3A-3C schematically illustrate an example audio device, such as an audio device 300 according to the present disclosure where a technique as disclosed herein is used. The audio device 300 comprises a first audio wearable 300A adapted to be worn at a first ear of a user and a second audio wearable 300B adapted to be worn at a second ear of the user. In FIG. 3A, a first audio signal S1 is obtained/received at the audio device 300, such as obtained/received at a first audio wearable 300A, and a second audio signal S2 is obtained/received at the audio device 300, such as received at a second audio wearable 300B. The head of the user is at a reference position of the user's head where an angle $\alpha$ is equal to 0. Since the head of the user is at a reference position of the user's head, no head orientation compensation is needed. In other words, the first filter would be equal to 1, since the head rotation angle is 0. Therefore, the audio device 300 is configured to output the first audio signal S1 at the first audio wearable 300A with no head orientation compensation, such as let the first audio signal S1 through as it is. It may be appreciated that the audio device 300 is configured to output the second audio signal S2 at the second audio wearable 300B with no head orientation compensation, such as let the second audio signal S2 through as it is.

In FIG. 3B, the user has moved his head with respect to the reference position of the user's head with an angle $\alpha$ different from 0. The first audio wearable 300A is configured to obtain head orientation data indicative of a head orientation of the user. In this example, the head orientation data comprises a head rotation angle $\alpha$, wherein the head rotation angle $\alpha$ is measured with respect to a line of sight L_1 of the user at a reference position of the user's head. It may be appreciated that the head rotation angle $\alpha$ is measured between a first line of sight L_1 at a reference position of the user's head and a second line of sight L_2 at a current position of the user's head. The first audio wearable 300A is configured to determine a first filter H1($\alpha$) based on the head orientation data, wherein the first filter H1($\alpha$) is based on a first delay and/or a first level compensation. The first audio wearable 300A is configured to apply the first filter H1($\alpha$) to the first audio signal S1 to compensate for the head orientation of the user for provision of a first filtered audio signal. The first audio wearable 300A is configured to output the first filtered audio signal at the first audio wearable 300A. In one or more example audio devices, it may be appreciated that only a first filter H1 may be applied to the first audio signal S1 and not a second filter H2 to the second audio signal S2. In other words, it may be possible to compensate for head orientation by applying a first filter on one side/ear of the user.

In one or more example audio devices, the second audio wearable 300B is configured to obtain a second audio signal S2.

In one or more example audio devices, the second audio wearable 300B is configured to obtain head orientation data indicative of a head orientation of the user of the audio device 300. In one or more example audio devices, the audio device 300, such as the second audio wearable 300B, is configured to determine a second filter H2($\alpha$) based on the head orientation data, wherein the second filter H2($\alpha$) is based on a second delay and/or a second level compensation. In one or more example audio devices, the audio device 300, such as the second audio wearable 300B, is configured to apply the second filter H2($\alpha$) to the second audio signal S2 to compensate for the head orientation of the user for provision of a second filtered audio signal. In one or more example audio devices, the audio device 300, such as the second audio wearable 300B, is configured to output the second filtered audio signal at the second audio wearable 300B.

In one or more example audio devices, the audio device 300 comprises a head orientation sensor configured to provide the head orientation data, wherein the first audio wearable 300A comprises the head orientation sensor, such as a first head orientation sensor 305A.

In one or more example audio devices, the second audio wearable 300B comprises a head orientation sensor, such as a second head orientation sensor 305B.

In one or more example audio devices, the audio device 300 is configured to send 50 the head orientation data from the first audio wearable 300A to the second audio wearable 300B. In one or more example audio devices, the audio device 300 is configured to send 50 the head orientation data from the audio device 300 to the first audio wearable 300A.

In one or more example audio devices, the first audio signal S1 and/or the second audio signal S2 are binaural audio signals.

In one or more example audio devices, the first filter H1(α) is a time domain filter and/or the second filter H2(α) is a time domain filter. A time domain filter may for example be a finite impulse response, FIR, filter.

In one or more example audio devices, the first filter H1(α) and/or the second filter H2(α) are frequency dependent.

In one or more example audio devices, the first filter H1(α) is frequency-based. In other words, the first compensation delay and/or the second compensation delay may be frequency dependent. In one or more example audio devices, the first filter H1(α) and/or the second filter H2(α) may be or comprise a head related transfer function, HRTF, filter.

In one or more example audio devices, the application of the first filter H1(α) to the first audio signal S1 is performed separately from the application of the second filter H2(α) to the second audio signal S2, and wherein the first filtered signal is determined separately from the second filtered signal.

In one or more example audio devices, the first audio wearable 300A is a first earpiece, and the second audio wearable 300B is a second earpiece.

In one or more example audio devices, the first audio wearable 300A is a first earcup, and the second audio wearable 300B is a second earcup.

FIG. 3C shows a similar scenario as in FIG. 3B of an example audio device according to this disclosure where a technique as disclosed herein is applied. In FIG. 3C, a different embodiment is shown compared to FIG. 3B, where a different type of filter(s) is/are applied. In the example of FIG. 3C, a constant filter is applied on the second audio signal, e.g., the second filter H'2(α) is constant. The second filter H'2(α) comprises the base delay BD. Therefore, a variable filter is applied only on the first audio wearable, such as only on the first audio signal. The first filter may be seen as head orientation dependent. The first filter H'1(α) =BS·H1(α)/H2(α). It may be appreciated that H1(α)/H2(α) may be approximated by a pure delay and/or a gain/attenuation, where the delay and/or the gain/attenuation are dependent on α. H1(α)/H2(α) may be frequency-dependent or not. H1(α)/H2(α) may in some situations be non-causal, however by multiplying H1(α)/H2(α) by a suitable delay, such as the base delay BD, D-H1(α)/H2(α) may become causal.

Figure 4A:
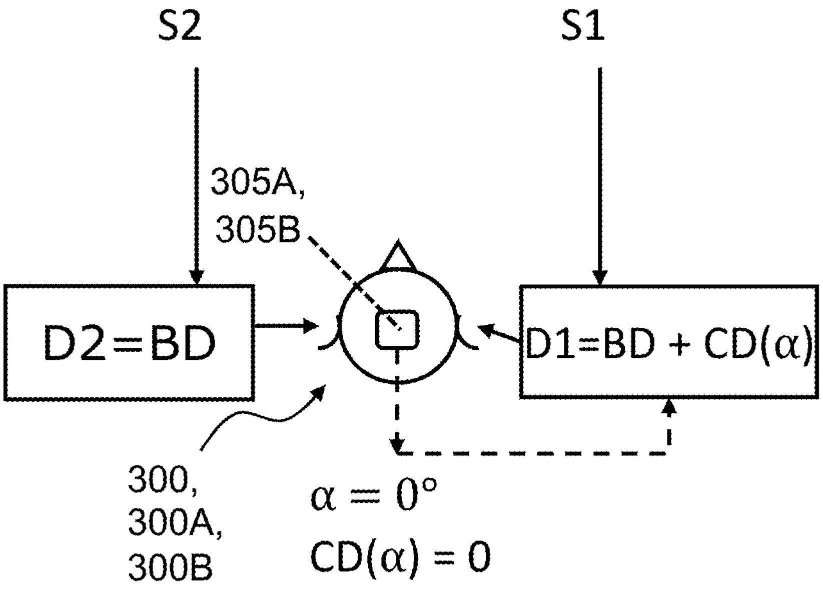
FIGS. 4A-4B schematically illustrate an example audio device according to the present disclosure where the technique disclosed herein is applied.
Figure 4B:
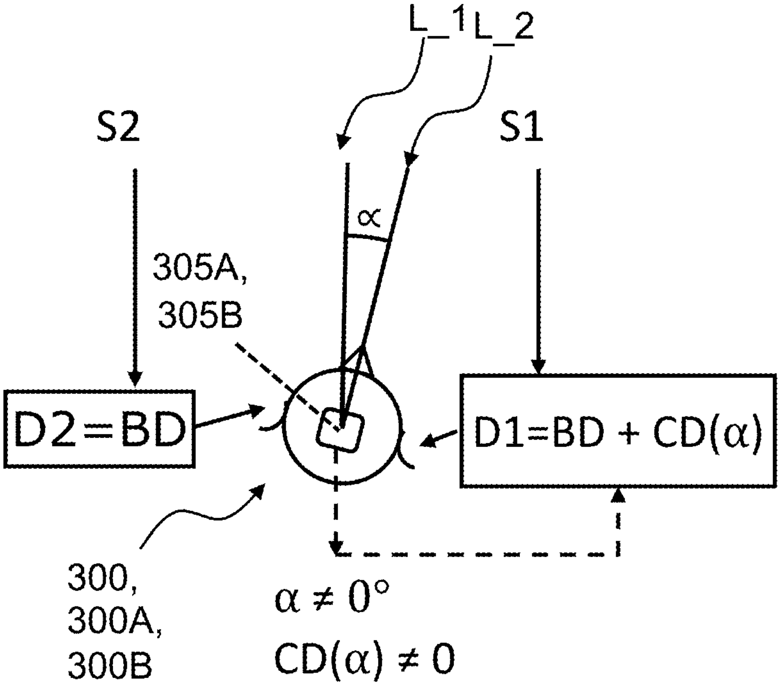

FIGS. 4A-4B schematically illustrate an example audio device, such as an audio device 300 according to the present disclosure where a technique as disclosed herein is used. FIGS. 4A-4B shows a similar audio device and a similar scenario as disclosed in FIGS. 3A-3B. In FIGS. 4A-4B the first delay D1 is based on a base delay BD and a first compensation delay CD(α). To apply the first filter H1(α) comprises to apply the first delay D1, such as the base delay BD and the first compensation delay CD(α), to the first audio signal S1. In the example of FIGS. 4A-4B, to apply the first filter may comprise to apply the first delay D1, such as only the first delay D1.

In FIG. 4A the head of the user is at a reference position of the user's head where an angle α, such as a head rotation angle, is equal to 0. Since the head of the user is at a reference position of the user's head, no head orientation compensation may be needed. In other words, the first compensation delay CD(α) would be equal to 0, since the head rotation angle is 0. Therefore, in FIG. 4A to apply the first filter comprises to apply the first delay, such as apply the first delay comprising the base delay BD, to the first audio signal S1. In one or more example audio devices, to apply the second filter comprises to apply the second delay, such as apply the second delay comprising the base delay BD, to the second audio signal S2. It may be appreciated that the same delay is applied to the first audio signal S1 and the second audio signal S2 when the head of the user is at a reference position of the user's head. In one or more example audio devices, the same base delay may be applied to the first audio signal S1 and to the second audio signal S2.

In FIG. 4B, the user has moved his head with respect to the reference position of the user's head with an angle α different from 0. In this example, the head orientation data comprises a head rotation angle α, wherein the head rotation angle α is measured with respect to a line of sight L_1 of the user at a reference position of the user's head. It may be appreciated that the head rotation angle α is measured between a first line of sight L_1 at a reference position of the user's head and a second line of sight L_2 at a current position of the user's head.

Since the head of the user has moved, the audio device 300 has to compensate for head orientation. In other words, the first compensation delay CD(α) would be different from 0, since the head rotation angle is different from 0. Therefore, in FIG. 4B to apply the first filter comprises to apply the first delay, such as apply the first delay comprising the base delay BD and the CD(α), to the first audio signal S1. In one or more example audio devices, to apply the second filter comprises to apply the second delay, such as apply the second delay comprising only the base delay BD, to the second audio signal S2. It may be appreciated that different filters may be applied to the first audio signal S1 and the second audio signal S2 but having the same base delay BD.

In one or more example audio devices, the base delay BD is a constant delay configured to be applied to the first audio signal S1 and the second audio signal S2.

In one or more example audio devices, the second delay D2 is based on the base delay BD and a second compensation delay CD_2(α) (not shown). In one or more example audio devices, to apply the second filter comprises to apply the second delay D2, such as the base delay BD and the second compensation delay CD_2(α) to the second audio signal S2.

In one or more example audio devices, the first compensation delay CD(α) is configured to modify an Interaural Time Difference, ITD, between the first audio signal S1 and the second audio signal S2. In one or more example audio devices, the second compensation delay CD_2(α) is configured to modify an Interaural Time Difference, ITD, between the first audio signal S1 and the second audio signal S2.

In one or more example audio devices, the first compensation delay CD(α) is frequency-based and/or the second compensation delay CD_2(α) is frequency-based.

The audio device 300 may be configured to perform any of the methods disclosed in FIGS. 3A-3B.

The processor 3000 is configured to perform any of the operations disclosed in FIG. 3A-3B (such as any one or more of S012, S104, S105, S106, S106A, S106B, S106C, S106D, S106E, S106F, S106G, S108, S108A, S110, S110A, S110B, S112, S114, S114A, S116).

The operations of the audio device 10 may be embodied in the form of executable logic routines (for example, lines of code, software programs, etc.) that are stored on a non-transitory computer readable medium (for example, memory) and are executed by the one or more processors 3000).

Furthermore, the operations of the audio device 300 may be considered a method that the audio device 300 is configured to carry out. Also, while the described functions and operations may be implemented in software, such functionality may as well be carried out via dedicated hardware or firmware, or some combination of hardware, firmware and/or software.

Memory of the audio device may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor 3000. The memory may exchange data with the processor 3000 over a data bus. Control lines and an address bus between the memory and the processor 3000 also may be present (not shown in FIG. 1). The memory is considered a non-transitory computer readable medium.

The memory may be configured to store information such as training audio data, audio data, latent space s, training manifolds, mapping parameters, and/or uncertainty parameters as disclosed herein in a part of the memory.

Figure 5A:
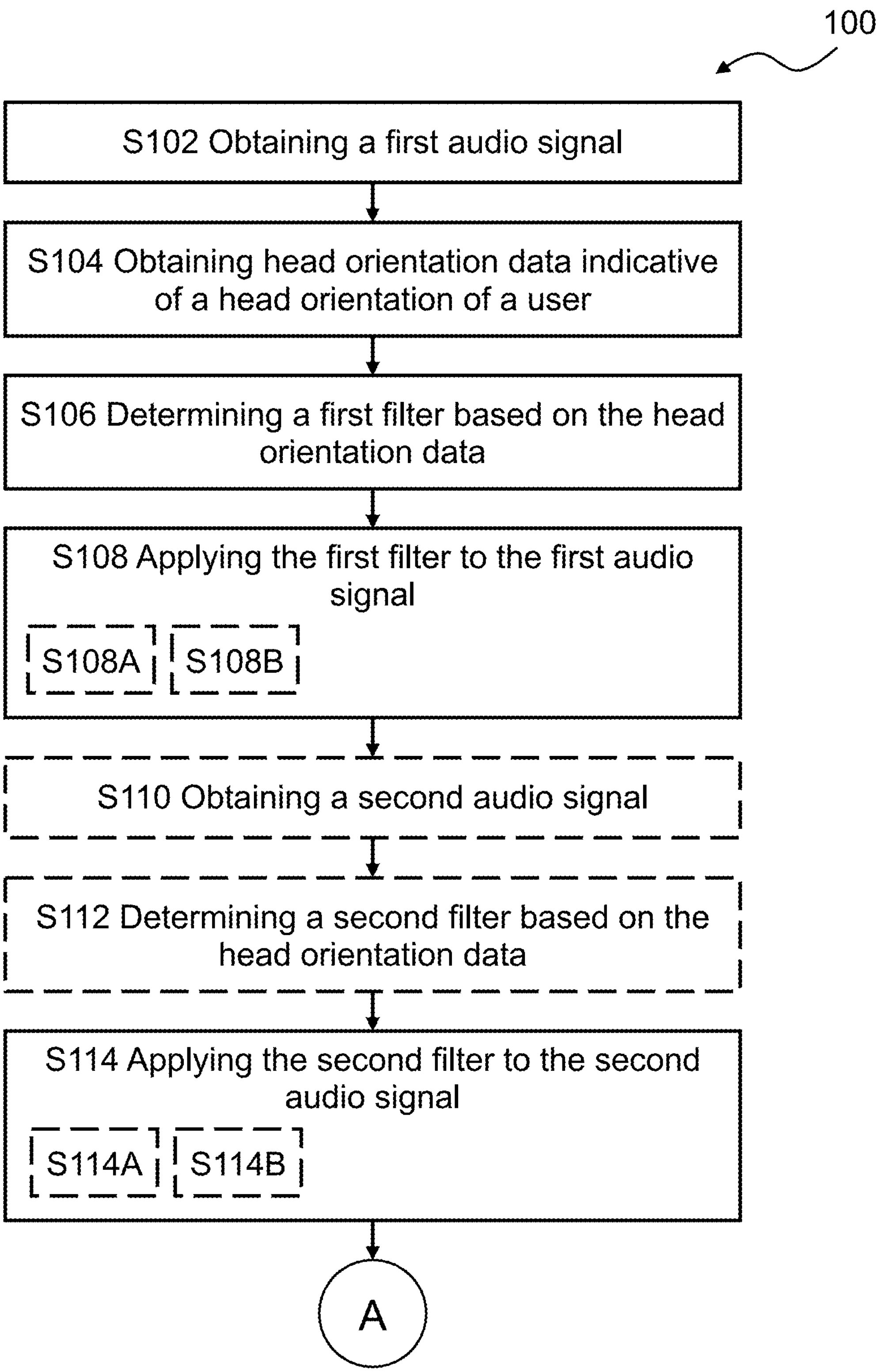
FIGS. 5A-5C shows a flow chart of an example method according to the present disclosure.
Figure 5B:
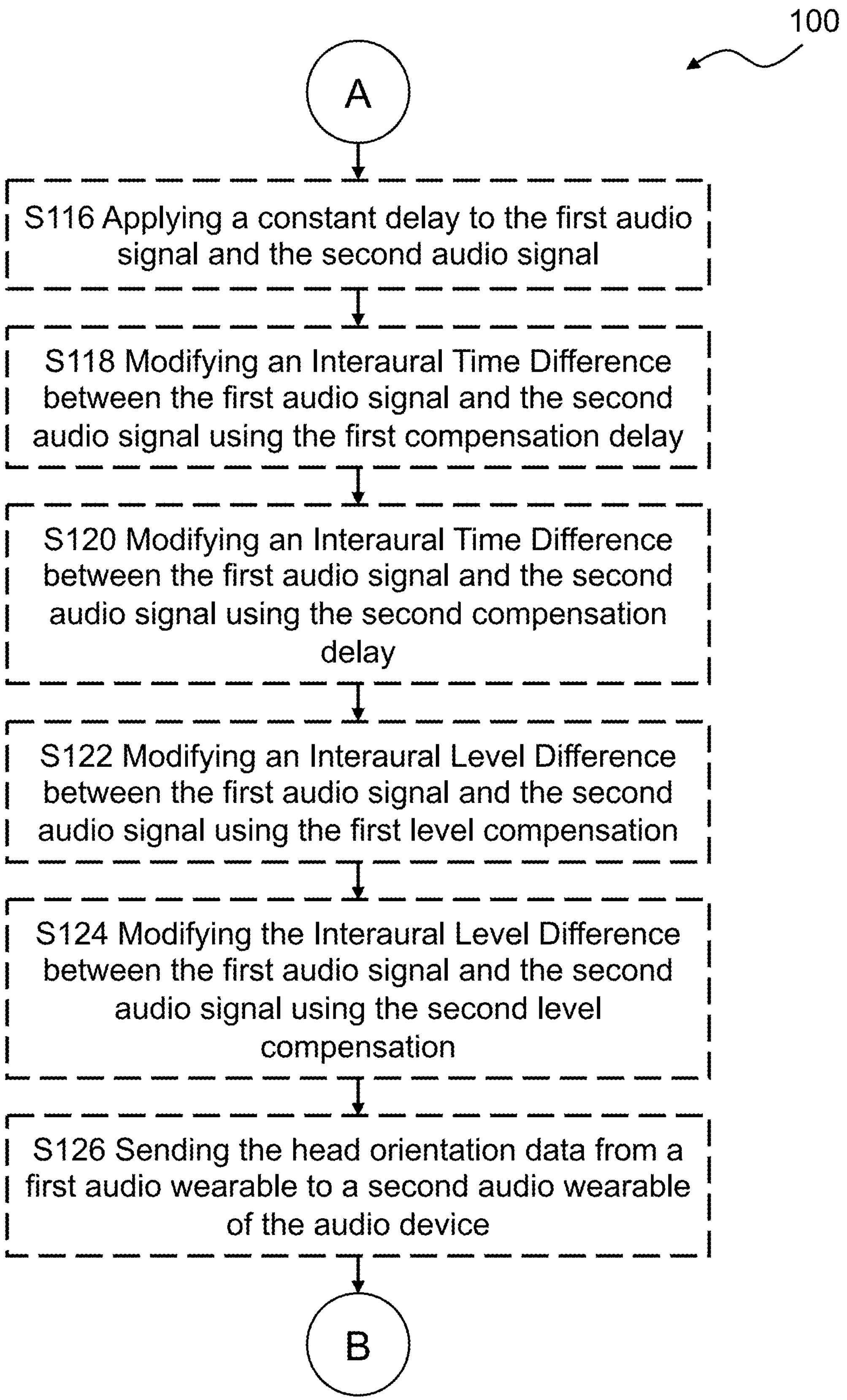
Figure 5C:
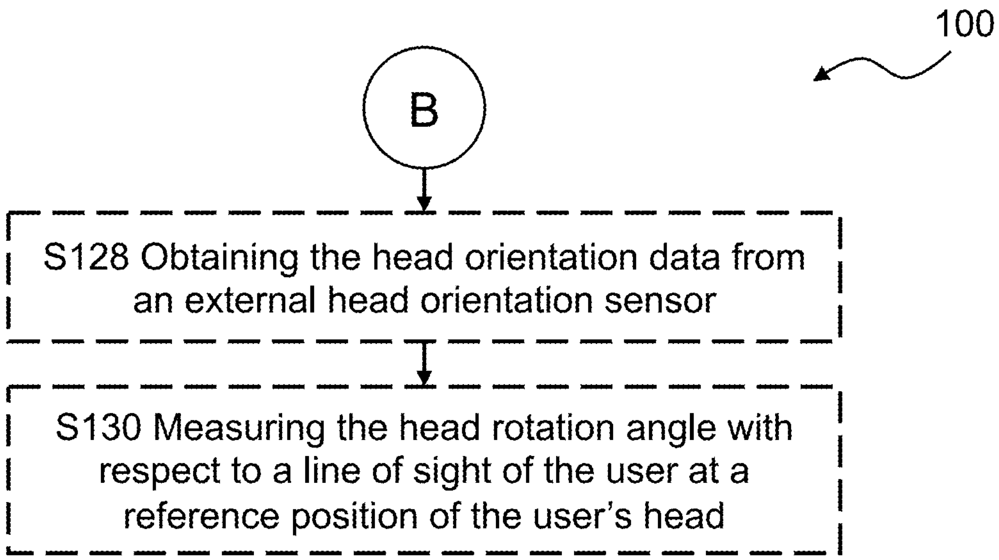

FIGS. 5A-5C show a flow diagram of an example method, such as a method 100.

The audio device may be the audio device as disclosed herein, such as audio device 300 of FIG. 1, and FIGS. 2A-4B. The method may be seen as a method of operating an audio device, such as a method for head orientation-based filtering. The method 100 comprises obtaining S102 a first audio signal.

The method 100 comprises obtaining S104 head orientation data indicative of a head orientation of a user.

The method 100 comprises determining S106 a first filter based on the head orientation data, wherein the first filter is based on a first delay and/or a first level compensation.

The method 100 comprises applying S108 the first filter to the first audio signal to compensate for the head orientation of the user for provision of a first filtered audio signal.

The method 100 comprises outputting S134 the first filtered audio signal.

In one or more example methods, the first delay is based on a base delay and a first compensation delay, and wherein applying S108 the first filter comprises applying S108A the base delay and the first compensation delay to the first audio signal.

In one or more example methods, the method 100 comprises obtaining S110 a second audio signal.

In one or more example methods, the method 100 comprises determining S112 a second filter based on the head orientation data, wherein the second filter is based on a second delay and/or a second level compensation.

In one or more example methods, the method 100 comprises applying S114 the second filter to the second audio signal for provision of a second filtered audio signal.

In one or more example methods, the method 100 comprises outputting S136 the second filtered audio signal.

In one or more example methods, the second delay is based on the base delay and a second compensation delay, and wherein applying S114 the second filter comprising applying S114A the base delay and the second compensation delay to the second audio signal.

In one or more example methods, the method 100 comprises applying S118 a constant delay to the first audio signal and the second audio signal.

In one or more example methods, the method 100 comprises modifying S120 an Interaural Time Difference between the first audio signal and the second audio signal using the first compensation delay.

In one or more example methods, the method 100 comprises modifying S122 an Interaural Time Difference between the first audio signal and the second audio signal using the second compensation delay.

In one or more example methods, the method 100 comprises modifying S124 an Interaural Level Difference between the first audio signal and the second audio signal using the first level compensation.

In one or more example methods, the method 100 comprises modifying S126 the Interaural Level Difference between the first audio signal and the second audio signal using the second level compensation.

In one or more example methods, the method 100 comprises sending S128 the head orientation data from a first audio wearable to a second audio wearable of the audio device.

In one or more example methods, the method 100 comprises obtaining S130 the head orientation data from an external head orientation sensor.

In one or more example methods, the head orientation data comprises a head rotation angle, and wherein the method comprising measuring S132 the head rotation angle with respect to a line of sight of the user at a reference position of the user's head.

In one or more example methods, the method 100 comprises applying S108 the first filter to the first audio signal separately from applying S114 the second filter to the second audio signal, and determining S108B the first filtered signal separately from determining S114B the second filtered signal.

Examples of audio devices, systems, and methods according to the disclosure are set out in the following items:

Item 1. An audio device comprising a first audio wearable adapted to be worn at a first ear of a user and a second audio wearable adapted to be worn at a second ear of the user, the first audio wearable comprising:
- a first output transducer,
- a first wireless communication interface,
- one or more first processors, and
- a first memory;
- wherein the first audio wearable is configured to:
- obtain a first audio signal via the first wireless communication interface;
- obtain head orientation data indicative of a head orientation of the user;
- determine a first filter based on the head orientation data, wherein the first filter is based on a first delay and/or a first level compensation;
- apply the first filter to the first audio signal to compensate for the head orientation of the user for provision of a first filtered audio signal, and output the first filtered audio signal at the first audio wearable.

Item 2. The audio device according to item 1, wherein the first delay is based on a base delay and a first compensation delay, and wherein to apply the first filter comprises to apply the first delay, such as base delay and the first compensation delay, to the first audio signal.

Item 3. The audio device according to any of the previous items, wherein the second audio wearable comprises:
- a second output transducer, a second wireless communication interface,
one or more second processors, and
a second memory;
wherein the second audio wearable is configured to:
obtain a second audio signal via the second wireless communication interface;
determine a second filter based on the head orientation data, wherein the second filter is based on a second delay and/or a second level compensation;
apply the second filter to the second audio signal for provision of a second filtered audio signal;
output the second filtered audio signal at the second audio wearable.

Item 4. The audio device according to item 3, wherein the second delay is based on the base delay and a second compensation delay, and wherein to apply the second filter comprises to apply the second delay, such as the base delay and the second compensation delay, to the second audio signal.

Item 5. The audio device according to item 4, wherein the base delay is a constant delay configured to be applied to the first audio signal and the second audio signal.

Item 6. The audio device according to any of items 2-5, wherein the first compensation delay is configured to modify an Interaural Time Difference between the first audio signal and the second audio signal, and the second compensation delay is configured to modify an Interaural Time Difference between the first audio signal and the second audio signal.

Item 7. The audio device according to any of items 2-6, wherein the first level compensation is configured to modify an Interaural Level Difference between the first audio signal and the second audio signal, and the second level compensation is configured to modify the Interaural Level Difference between the first audio signal and the second audio signal.

Item 8. The audio device according to any of the previous items, wherein the audio device comprises a head orientation sensor configured to provide the head orientation data, wherein the first audio wearable comprises the head orientation sensor.

Item 9. The audio device according to item 8, wherein the audio device is configured to send the head orientation data from the first audio wearable to the second audio wearable.

Item 10. The audio device according to any of the previous items, wherein the audio device is configured to obtain the head orientation data from an external head orientation sensor via the first wireless communication interface.

Item 11. The audio device according to any of the previous items, wherein the head orientation data comprises a head rotation angle, wherein the head rotation angle is measured with respect to a line of sight of the user at a reference position of the user's head.

Item 12. The audio device according to any of the previous items or according to any of items 3-11, wherein the first audio signal and/or the second audio signal are binaural audio signals.

Item 13. The audio device according to any of the previous items or according to any of items 3-12, wherein the first filter is a time domain filter and/or the second filter is a time domain filter.

Item 14. The audio device according to any of the previous items or according to any of items 4-13, wherein the first compensation delay is frequency-based and/or the second compensation delay is frequency-based.

Item 15. The audio device according to any of items 3-14, wherein the application of the first filter to the first audio signal is performed separately from the application of the second filter to the second audio signal, and wherein the first filtered signal is determined separately from the second filtered signal.

Item 16. The audio device according to any of the previous items, wherein the first audio wearable is a first earpiece, and the second audio wearable is a second earpiece.

Item 17. The audio device according to any of items 1-15, wherein the audio device is a headset and wherein the first audio wearable is a first earcup and the second audio wearable is a second earcup.

Item 18. A method (100) of operating an audio device, the method comprising:
obtaining (S102) a first audio signal;
obtaining (S104) head orientation data indicative of a head orientation of a user;
determining (S106) a first filter based on the head orientation data, wherein the first filter is based on a first delay and/or a first level compensation;
applying (S108) the first filter to the first audio signal to compensate for the head orientation of the user for provision of a first filtered audio signal, and outputting (S134) the first filtered audio signal.

Item 19. The method according to item 18, wherein the first delay is based on a base delay and a first compensation delay, and wherein applying (S108) the first filter comprises applying (S108A) the base delay and the first compensation delay to the first audio signal.

Item 20. The method according to any of items 18-19, the method comprising:
obtaining (S110) a second audio signal;
determining (S112) a second filter based on the head orientation data, wherein the second filter is based on a second delay and/or a second level compensation;
applying (S114) the second filter to the second audio signal for provision of a second filtered audio signal;
outputting (S136) the second filtered audio signal.

Item 21. The method according to item 20, wherein the second delay is based on the base delay and a second compensation delay, and wherein applying (S114) the second filter comprising applying (S114A) the base delay and the second compensation delay to the second audio signal.

Item 22. The method according to item 21, the method comprising applying (S118) a constant delay to the first audio signal and the second audio signal.

Item 23. The method according to any of items 19-22, the method comprising modifying (S120) an Interaural Time Difference between the first audio signal and the second audio signal using the first compensation delay, and modifying (S122) an Interaural Time Difference between the first audio signal and the second audio signal using the second compensation delay.

Item 24. The method according to any of items 19-23, the method comprising modifying (S124) an Interaural Level Difference between the first audio signal and the second audio signal using the first level compensation, and modifying (S126) the Interaural Level Difference between the first audio signal and the second audio signal using the second level compensation.

Item 25. The method according to any of items 18-24, the method comprising sending (S128) the head orientation data from a first audio wearable to a second audio wearable of the audio device.

Item 26. The method according to any of items 18-25, the method comprising obtaining (S130) the head orientation data from an external head orientation sensor.

Item 27. The method according to any of items 18-27, wherein the head orientation data comprises a head rotation angle, and wherein the method comprising measuring (S132) the head rotation angle with respect to a line of sight of the user at a reference position of the user's head.

Item 28. The method according to any of items 18-27, the method comprising applying (S108) the first filter to the first audio signal separately from applying (S114) the second filter to the second audio signal, and determining (S108B) the first filtered signal separately from determining (S114B) the second filtered signal.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

LIST OF REFERENCES

50 send
200 audio device
200A first audio wearable
200B second audio wearable
300 audio device
300A first audio wearable
300B second audio wearable
301A first memory
301B second memory
302A one or more first processors
302B one or more second processors
303A first wireless communication interface
303B second wireless communication interface
304A first output transducer
304B second output transducer
305A first head rotation sensor
305B second head rotation sensor
S1 first audio signal
S2 second audio signal
L_1 first line of sight
L_2 second line of sight
H1, H'1 first filter
H2, H'2 second filter
α head rotation angle
D1 first delay
D2 second delay
BD base delay
CD compensation delay
CD_1 first compensation delay
CD_2 second compensation delay
100 Method of operating an audio device
S102 Obtaining first audio signal
S104 Obtaining head orientation data
S106 Determining a first filter based on the head orientation data
S108 Applying the first filter to the first audio signal to compensate for the head orientation of the user for provision of a first filtered audio signal
S134 Outputting the first filtered audio signal

The invention claimed is:

1. An audio device comprising a first audio wearable adapted to be worn at a first ear of a user and a second audio wearable adapted to be worn at a second ear of the user, the first audio wearable comprising:

a first output transducer, a first wireless communication interface, a head orientation sensor, one or more first processors, and a first memory;

wherein the first audio wearable is configured to:

obtain a first audio signal via the first wireless communication interface;

obtain head orientation data via the head orientation sensor indicative of a head orientation of the user;

determine a first filter based on the head orientation data, wherein the first filter is based on a first level compensation, wherein the first level compensation is configured to modify an Interaural Level Difference between the first audio signal and a second audio signal of the second audio wearable by only applying level compensation on the first audio wearable;

apply the first filter to the first audio signal to compensate for the head orientation of the user for provision of a first filtered audio signal, and output the first filtered audio signal at the first audio wearable.

2. The audio device according to claim 1, wherein the second audio wearable comprises:

a second output transducer, a second wireless communication interface, one or more second processors, and a second memory;

wherein the second audio wearable is configured to:

obtain the second audio signal via the second wireless communication interface;

apply a base delay to the second audio signal for provision of a second filtered audio signal;

output the second filtered audio signal at the second audio wearable;

wherein the first filter is based on a first delay and the first level compensation, wherein the first delay is based on the base delay and a first compensation delay, and wherein to apply the first filter comprises to apply the first delay to the first audio signal.

3. The audio device according to claim 2, wherein the base delay is a constant delay configured to be applied to the first audio signal and the second audio signal.

4. The audio device according to claim 2, wherein the first compensation delay is configured to modify an Interaural Time Difference between the first audio signal and the second audio signal, by applying the first compensation delay to the first audio signal.

5. The audio device according to claim 1, wherein the audio device is configured to send the head orientation data from the first audio wearable to the second audio wearable.

6. The audio device according to claim 1, wherein the head orientation data comprises a head rotation angle, wherein the head rotation angle is measured with respect to a line of sight of the user at a reference position of the user's head.

7. The audio device according to claim 1, wherein the first audio signal and/or the second audio signal are binaural audio signals.

8. The audio device according to claim 2, wherein the first audio signal and/or the second audio signal are binaural audio signals.

9. The audio device according to claim 1, wherein the first filter is a time domain filter.

10. The audio device according to claim 2, wherein the first filter is a time domain filter.

11. The audio device according to claim 1, wherein the first compensation delay is frequency-based.

12. The audio device according to claim 2, wherein the first compensation delay is frequency-based.

13. The audio device according to claim 1, wherein the first audio wearable is a first earpiece, and the second audio wearable is a second earpiece.

14. The audio device according to claim 1, wherein the audio device is a headset and wherein the first audio wearable is a first earcup and the second audio wearable is a second earcup.

15. A method of operating an audio device comprising a first audio wearable, a second audio wearable, a first wireless communication interface, and a head orientation sensor, the method comprising:

obtaining a first audio signal via the first communication interface;

obtaining head orientation data via the head orientation sensor indicative of a head orientation of a user;

determining a first filter based on the head orientation data, wherein the first filter is based on a first level compensation and wherein the first level compensation is configured to modify an Interaural Level Difference between the first audio signal and a second audio signal of the second audio wearable by only applying level compensation on the first audio wearable;

applying the first filter to the first audio signal to compensate for the head orientation of the user for provision of a first filtered audio signal, and outputting the first filtered audio signal at the first audio wearable.

* * * * *